(12) United States Patent
Park et al.

(10) Patent No.: US 7,671,961 B2
(45) Date of Patent: *Mar. 2, 2010

(54) LIQUID CRYSTAL DISPLAY DEVICE AND METHOD FOR MANUFACTURING THE SAME

(75) Inventors: Seoung Jin Park, Daegu-Si (KR); Moo Hyoung Song, Daegu-Si (KR)

(73) Assignee: LG Display Co., Ltd., Seoul (KR)

( * ) Notice: Subject to any disclaimer, the term of this patent is extended or adjusted under 35 U.S.C. 154(b) by 377 days.

This patent is subject to a terminal disclaimer.

(21) Appl. No.: 11/477,679

(22) Filed: Jun. 30, 2006

(65) Prior Publication Data

US 2007/0085967 A1  Apr. 19, 2007

(30) Foreign Application Priority Data

Oct. 19, 2005  (KR) .................... 10-2005-0098586

(51) Int. Cl.
*G02F 1/1333* (2006.01)
*G02F 1/1339* (2006.01)

(52) U.S. Cl. .................... 349/155; 349/156; 349/157
(58) Field of Classification Search ............... None
See application file for complete search history.

(56) References Cited

U.S. PATENT DOCUMENTS

| 2005/0190338 A1* | 9/2005 | Lim .................... 349/156 |
| 2007/0070281 A1* | 3/2007 | Choi ................... 349/141 |
| 2007/0132936 A1* | 6/2007 | Lee et al. .............. 349/156 |

* cited by examiner

*Primary Examiner*—Michelle R Connelly Cushwa
(74) *Attorney, Agent, or Firm*—Holland & Knight LLP

(57) ABSTRACT

A liquid crystal display device includes a first substrate and a second substrate facing each other, column spacers at designated areas of the second substrate, protrusions having a first height on the first substrate corresponding to portions of the column spacers, compensation patterns having a second height on the first substrate corresponding to the edges of the column spacers, the second height being lower than the first height, and a liquid crystal layer filling a gap between the first and second substrates.

28 Claims, 8 Drawing Sheets

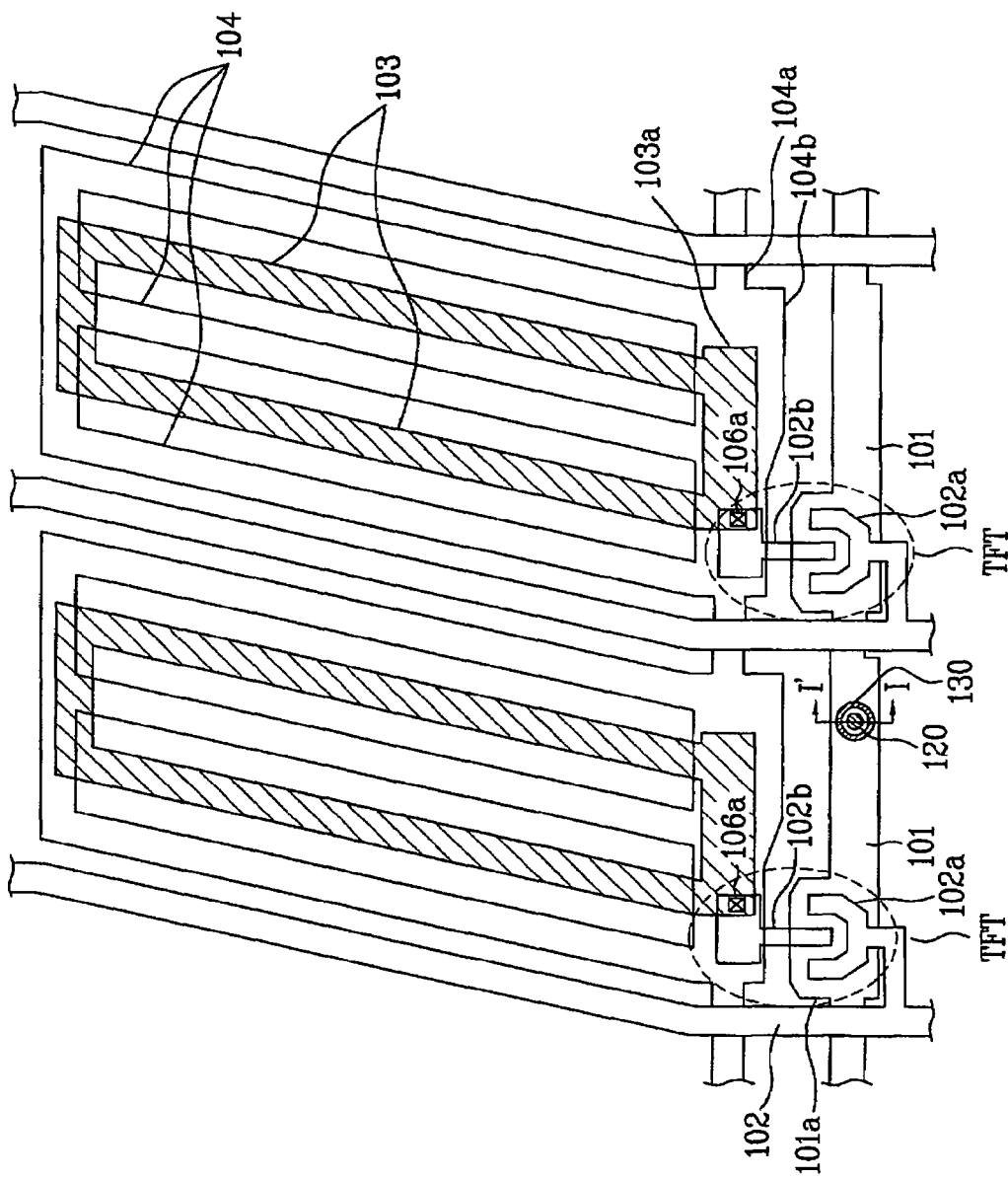

LIQUID CRYSTAL DISPLAY DEVICE AND METHOD FOR MANUFACTURING THE SAME

This application claims the benefit of Korean Patent Application No. P2005-0098586, filed on Oct. 19, 2005, which is hereby incorporated by reference in its entirety.

BACKGROUND OF THE INVENTION

1. Field of the Invention

The present invention relates to a display device, and more particularly, to a liquid crystal display device and a method for manufacturing the same. Although the present invention is suitable for a wide scope of applications, it is particularly suitable for preventing a touch failure on the display screen of the liquid crystal display device.

2. Discussion of the Related Art

As the information age has developed, the need for a flat panel display device has increased. To meet this need, various types of flat panel display devices, such as a liquid crystal display (LCD), a plasma display panel (PDP), an electro luminescent display (ELD), and a vacuum fluorescent display (VFD), have been developed. Such flat panel display devices are used as display devices in different types of apparatuses.

Recently, the LCD is the flat panel display that has been replacing the cathode ray tube (CRT) because the LCD has lighter weight, thinner profile, and lower power consumption than the CRT. Further, the CRT is used for various other display purposes, such as a monitor of a notebook computer. To use the LCD as an image display device in a variety of fields, it is important to maintain the advantageous characteristics of the LCD, such as light weight, thin profile, and low power consumption as well as a high-quality image having high definition and high luminance.

In general, a liquid crystal display device includes a first substrate and a second substrate, which are bonded to each other with a gap therebetween, and a liquid crystal display layer injected into the space between the first substrate and the second substrate. A plurality of gate lines are disposed at regular intervals in a first direction and a plurality of data lines are disposed at regular intervals in a second direction perpendicular to the first direction on the first substrate. The data lines and the gate lines cross each other and define pixel regions. Pixel electrodes are respectively formed in the pixel regions, and TFTs are formed at the crossings of the gate lines and the data lines in the pixel regions to apply data signals from the data lines to the pixel electrodes in response to signals applied to the gate lines.

A black matrix layer for blocking light is formed on the second substrate. Red, green, and blue color filter layers are formed in the black matrix corresponding to the pixel regions for forming colors. The black matrix layer blocks light except at the portions corresponding to the Red, Green, and Blue color filter layers. A common electrode is form on the color filter layers for forming an image together with the pixel electrode.

In the liquid crystal display device described above, the liquid crystal molecules of the liquid crystal layer between the first and second substrates is oriented by an electric field formed between the pixel electrodes and the common electrode such that the amount of light penetrating through the liquid crystal layer is controlled according to the orientation degree of the liquid crystal molecules. Such a liquid crystal display device is referred to as a twisted nematic (TN) mode liquid crystal display device. The TN mode liquid crystal display device has a narrow viewing angle. To solve the drawback of a narrow viewing angle in the TN mode liquid crystal display device, an in-plane switching (IPS) mode liquid crystal display device has been developed.

In the IPS mode liquid crystal display device, parallel pixel electrodes and common electrodes, which are separated from each other by a designated interval, are both formed on the first substrate in the pixel regions so that a horizontal electric field is generated between the pixel and common electrodes, and the liquid crystal molecules of the liquid crystal layer are oriented by the horizontal electric field.

Spacers for maintaining a gap for the liquid crystal layer are provided between the first and second substrates in both the IPS mode and TN mode LCD devices. The spacers can either be ball spacers or column spacers. The ball spacers have a spherical shape, and are scattered in between the first and second substrates such that they move relatively freely about even after the first and second substrates are bonded to each other, and have a small contact area with the first and second substrates. The column spacers have a column shape at a designated height that are formed during fabrication of one of the first and second substrates, and are affixed to one of the first and second substrates. In contrast to the ball spacers, the column spacers have large contact areas with the first and second substrates.

FIG. 1 is a cross-sectional view of the related art liquid crystal display device having column spacers. As shown in FIG. 1, the liquid crystal display device 10 includes a first substrate 30 and a second substrate 40, which face each other, column spacers 20 formed between the first and second substrates 30 and 40, and a liquid crystal layer (not shown) filling a gap between the first and second substrates 30 and 40. Gate lines 31 and data lines (not shown) perpendicularly cross each other on the first substrate 30 to define pixel regions (not shown). TFTs (not shown) are formed at crossings of the gate lines 31 and the data lines in the pixel regions, and pixel electrodes (not shown) are formed in the pixel regions. Further, a gate insulating film 36 is formed over the surface of the first substrate 30, including the gate lines 31, and a passivation film 37 is formed on the gate insulating film 36.

A black matrix layer 41 for blocking light is formed on the second substrate 40. A stripe-shaped color filter layer 42 corresponding to the pixel regions and having color filters arranged in a longitudinal direction parallel with the data lines formed on the black matrix layer 41. A common electrode or an overcoat layer 43 is formed on the stripe-shaped color filter layer 42 of the second substrate 40. The column spacers 20 are formed at designated positions above the gate lines 31.

FIGS. 2A and 2B are respective plan and cross-sectional views of a touch failure of a related art liquid crystal display device having column spacers. As shown in FIGS. 2A and 2B, when the surface of the above related art liquid crystal display device 10 is touched by a hand or other objects in a designated direction, a defect in the display of the liquid crystal display device 10 is generated at the touched region. This type of display defect is referred to as a touch stain or touch failure.

The column spacers 20 have a large contact area between the column spacers 20 and the first substrate 1 as compared to a liquid crystal display device having ball spacers. The large contact area increases frictional force therebetween such that a touch failure. That is, compared to the ball spacers, since the column spacers 20 having cylindrical shapes as shown in FIG. 2B, have a large contact area with the first substrate 1, it takes a long time to return the first or second substrate 1 or 2 to its original state after the first or second substrate 1 or 2 is shifted, and a stain remains for a long time.

The related art liquid crystal display device having column spacers has several problems. A contact area between the column spacers and the substrate opposite thereto is large, thus increasing friction between the column spacers and the opposite substrate. When the liquid crystal display device is touched such that one of the substrates is shifted, it takes a long time for the shifted substrate to return to its original state because of the friction, and thus a stain can remain indefinitely. Further, when the liquid crystal display device having the column spacers is stood upright in a high-temperature environment, the liquid crystal can thermally expand the cell gap to a height larger than the column spacers such that the liquid crystal flows down toward the lower end of the liquid crystal display device so as to cause a swollen opaque area.

SUMMARY OF THE INVENTION

Accordingly, the present invention is directed to a liquid crystal display device and a method for manufacturing the same that substantially obviate one or more of the problems due to limitations and disadvantages of the related art.

An object of the present invention is to provide a liquid crystal display device to prevent a touch failure, and method for manufacturing the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described herein, a liquid crystal display device includes a first substrate and a second substrate facing each other, column spacers at designated areas of the second substrate, protrusions having a first height on the first substrate corresponding to portions of the column spacers, compensation patterns having a second height on the first substrate corresponding to the edges of the column spacers, the second height being lower than the first height, and a liquid crystal layer filling a gap between the first and second substrates.

In another aspect, a liquid crystal display device includes a first substrate and a second substrate facing each other, gate lines and data lines crossing each other on the first substrate for defining pixel regions, thin film transistors at the crossing of the gate lines and the data lines, pixel electrodes in the pixel regions, protrusions having a first height over the gate lines on the first substrate, compensation patterns about the protrusions having a second height on the first substrate, the second height being lower than the first height, column spacers having portions corresponding to the protrusions and edges corresponding to the compensation patterns, and a liquid crystal layer filling a gap between the first and second substrates.

In another aspect, a method for manufacturing a liquid crystal display device includes forming gate lines on a first substrate, depositing a gate insulating film, a semiconductor layer, and a source/drain metal layer over the first substrate, including the gate lines, forming data lines crossing the gate lines, source electrodes extending from the data lines, and drain electrodes separated from the source electrodes by a designated interval, and protrusions on the gate lines by selectively removing the source/drain metal layer and the semiconductor layer, forming a passivation film over the first substrate, including the data lines, forming contact holes exposing designated portions of the upper parts of the drain electrodes, forming pixel electrodes by depositing a transparent electrode on the surface of the passivation film, including the contact holes, and simultaneously forming compensation patterns about the protrusions, the compensation patterns having a height lower than that of the protrusions, forming column spacers having portions corresponding to the protrusions and edges corresponding to the compensation patterns, and forming a liquid crystal layer between the first substrate and the second substrate.

In yet another aspect, a method for manufacturing a liquid crystal display device includes forming gate lines on a first substrate, depositing a gate insulating film, a semiconductor layer, and a source/drain metal layer over the first substrate, including the gate lines, forming data lines crossing the gate lines, source electrodes extending from the data lines, and drain electrodes separated from the source electrodes by a designated interval, and protrusions on the gate lines by selectively removing the source/drain metal layer and the semiconductor layer and simultaneously forming compensation patterns having a height lower than that of the protrusions, forming a passivation film over the first substrate, including the data lines, forming contact holes exposing designated portions of the drain electrodes, forming pixel electrodes over the passivation film, including the contact holes, forming column spacers having portions corresponding to the protrusions and edges corresponding to the compensation patterns, and forming a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7 is a plan view of the liquid crystal display device in accordance with an embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
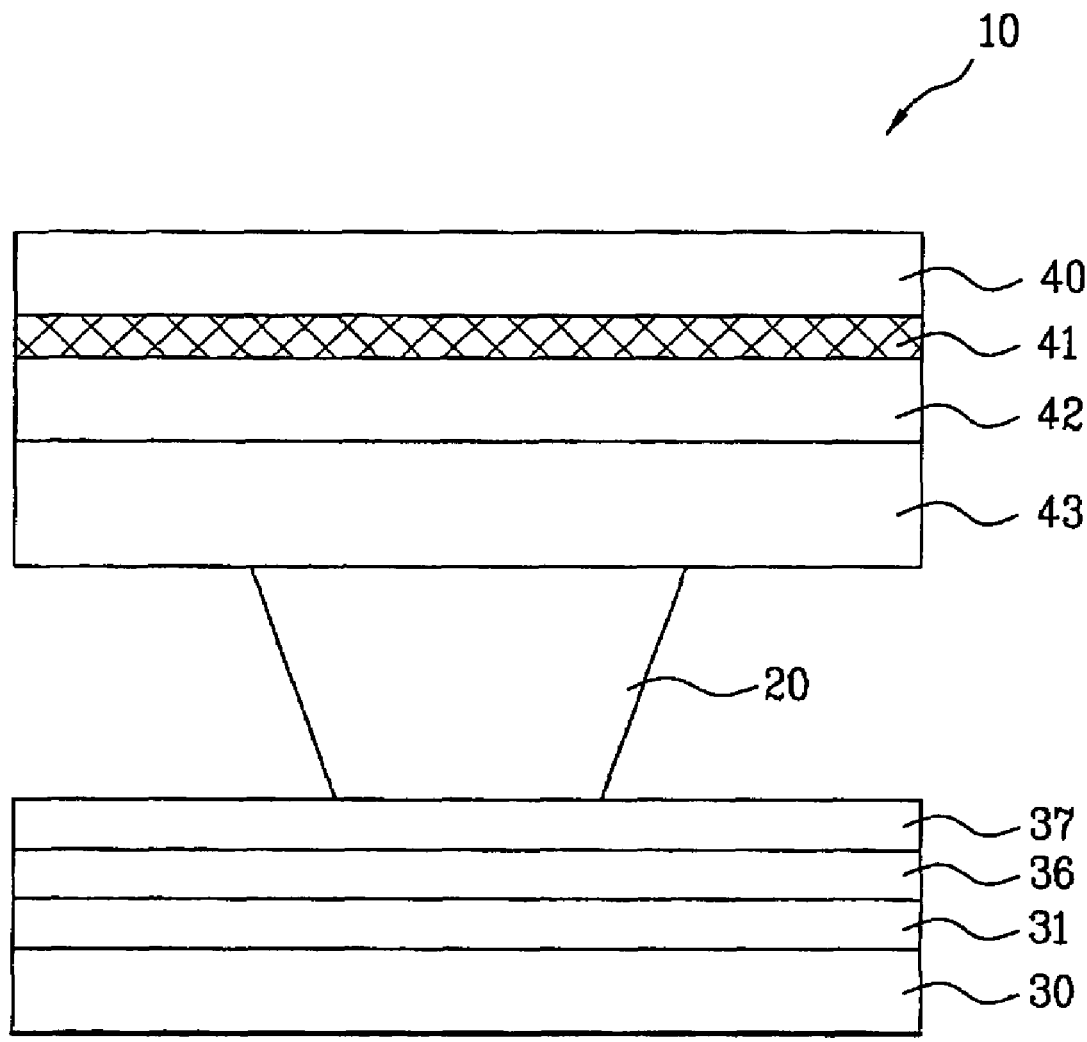
FIG. 1 is a cross-sectional view of the related art liquid crystal display device having column spacers.
Figure 2A:
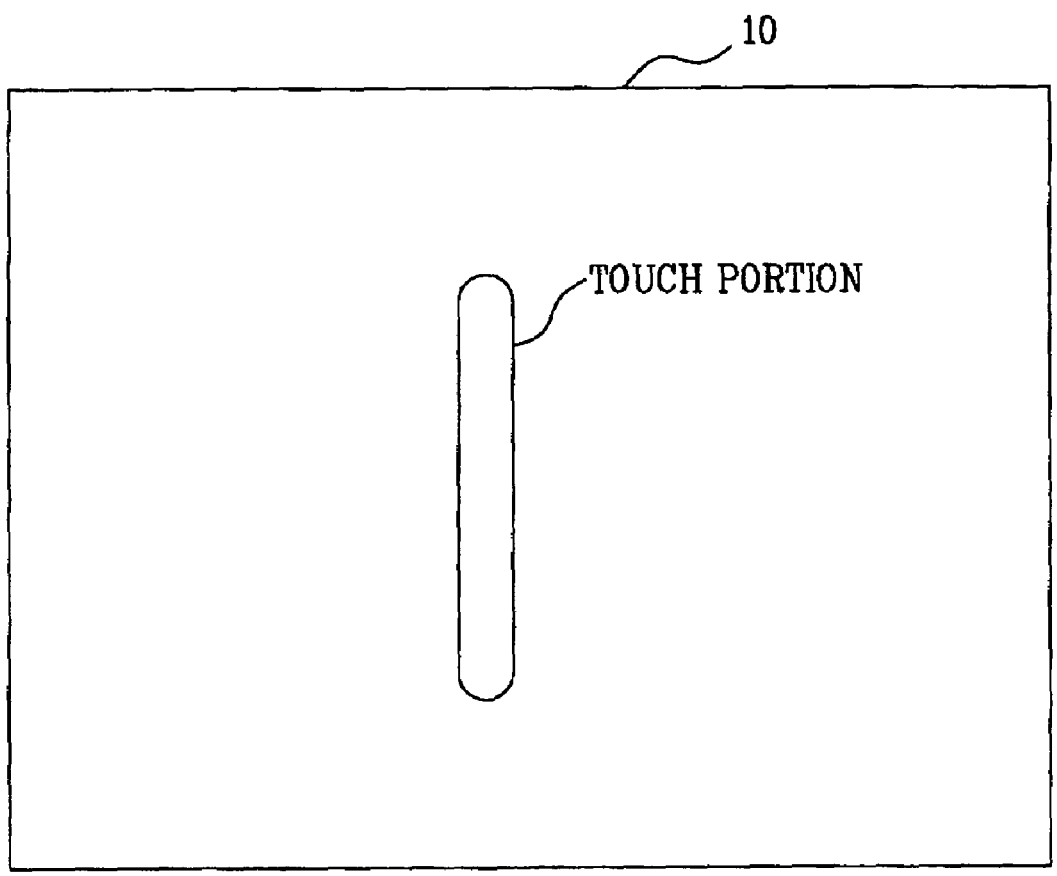
FIGS. 2A and 2B are respective plan and cross-sectional views of a touch failure of the related art liquid crystal display device having column spacers.
Figure 2B:
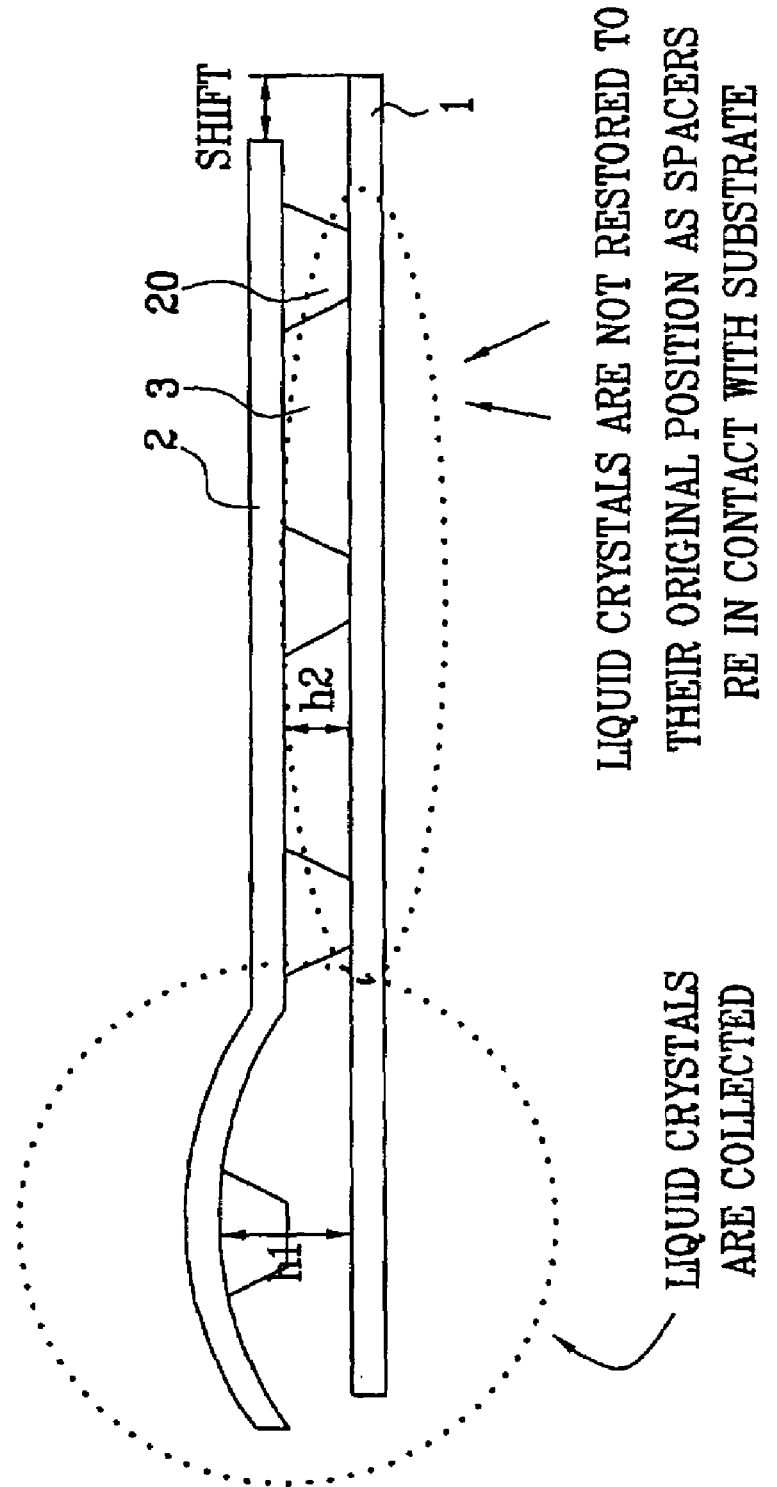
Figure 3:
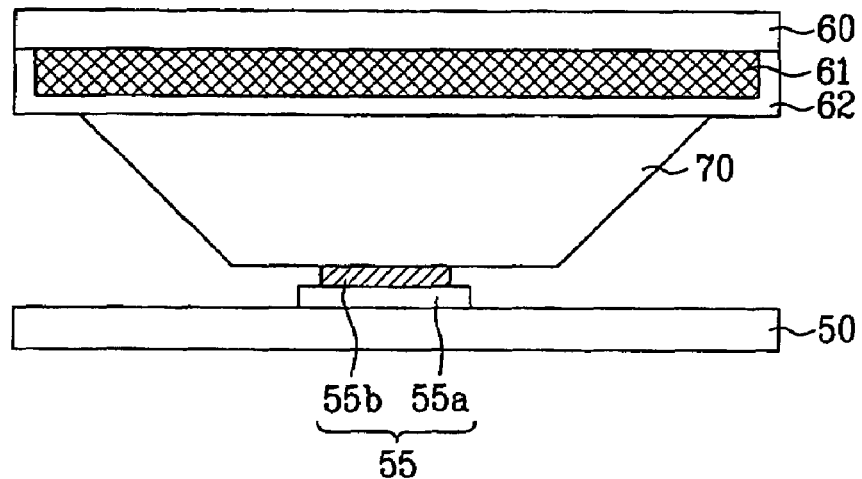
FIG. 3 is a cross-sectional view of a liquid crystal display device having protruding structures in accordance with an embodiment of the present invention.

FIG. 3 is a cross-sectional view of a liquid crystal display device having protruding structures in accordance with an embodiment of the present invention. As shown in FIG. 3, the liquid crystal display device having protruding structures includes a first substrate 50 and a second substrate 60, which face each other, column spacers 70 formed at designated portions of the second substrate 60, protrusions 55 formed on the first substrate 50 such that the protrusions 55 have a volume smaller than that of the column spacers 70 and contact a portion of the column spacers 70, and a liquid crystal layer (not shown) filling a gap between the first and second substrates 50 and 60. The protrusions 55 have a double-layered structure including a lower semiconductor layer pattern 55a and an upper source/drain metal layer 55b. The column spacers 70 are formed on one of or both a black matrix layer 61 and a color filter layer 62 of the second substrate 60.

In the liquid crystal display device having the protrusions 55, when the first substrate 50 or the second substrate 60 is shifted with respect to each other by a touching of the surface of the first substrate 50 or the second substrate 60, a shift can occur between the first and second substrates 50 and 60. Because the area of the upper surface of protrusion 55 contacting the columns spacer 70 is smaller than the area of the lower surface of the column spacer 70 contacting the protrusion 55, a frictional force between the column spacers 70 and the protrusions 55 on the first substrate 50 opposite to the column spacers 70 is reduced. Accordingly, when the first substrate 50 or the second substrate 60 is shifted in one direction by a touch, the shifted substrate, either the first or second substrate 50 or 60, easily returns to its original position.

In the liquid crystal display device having the protrusions 55, when the first and second substrates 50 and 60 are bonded to each other, the shapes of the column spacers 70 corresponding to the protrusions 55 are slightly changed. That is, a compression force maybe applied to the column spacers 70 corresponding to the protrusion 55 as a result of binding the first and second substrates 50 and 60, thereby depressing the column spacers 70 onto the color filter layer 62 and the black matrix layer 62. Because the column spacers 70 are compressed, the column spacers 70 can decompress during a thermal expansion of the liquid crystal and still maintain contact with the protrusion 55. A liquid crystal display device having the protrusions 55 contacting compressed column spacers 70 prevents the liquid crystal layer from flowing in spaces that may otherwise form between the protrusions 55 and the column spacers 70 due to liquid crystal thermal expansion, as compared to a liquid crystal display device without compressed columns spacers 70 on protrusions 55. In other words, protrusions 55 contacting compressed column spacers 70 prevents liquid crystal flows down toward the lower end of the liquid crystal display device if thermal expansion of the liquid crystal occurs.

In the case when protrusions 55 are contacting compressed column spacers 70, the compressing force is concentrated at a central portion of each of the column spacers 70 corresponding to the protrusion 55. When the compressing force between the first and second substrates 50 and 60 is excessively large, the column spacers 70 can be deformed such that column spacers 70 do not return to their original state. A deformed column spacer can have increased friction because the column spacer can deform around the corresponding protrusion and no longer be able to prevent a space between the protrusion and the column spacer when a thermal expansion of the liquid crystal occurs. Thus, touch stains and opaque areas may occur if a column spacer is deformed.

Figure 4:
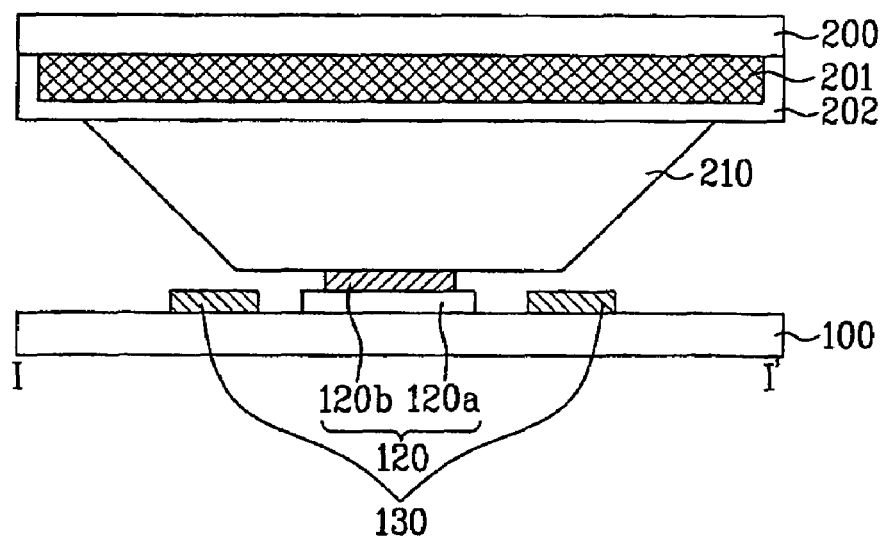
FIG. 4 is a cross-sectional view of a liquid crystal display device in accordance with an embodiment of the present invention.

FIG. 4 is a cross-sectional view of a liquid crystal display device in accordance with an embodiment of the present invention. As shown in FIG. 4, the liquid crystal display device of an embodiment of the present invention includes a first substrate 100 and a second substrate 200, which face each other, column spacers 210 formed at designated portions of the second substrate 200, protrusions 120 having a first height above the first substrate 100 are formed on the first substrate 100 corresponding to the central portions of the column spacers 210, compensation patterns 130 having a second height above the first substrate 100 are formed on the first substrate corresponding to edges of the column spacers 210, and a liquid crystal layer (not shown) filling a space between the first and second substrates 100 and 200. The first height of the protrusion 120 is larger than the second height of the compensation patterns 130.

The protrusions 120 can have a double-layered structure of a lower semiconductor layer pattern 120a and an upper source/drain metal layer 120b. The compensation patterns 130 are made of the same material as that of the semiconductor layer pattern 120a, the source/drain metal layer 120b, or a transparent electrode material. The compensation patterns 130 have a single-layered structure so as to have an overall height above the first substrate 100 that is lower than that of the protrusions 120.

The column spacers 210 are formed on a black matrix layer 201 and a color filter layer 202, which are both on the second substrate 200. In the alternative, an overcoat layer may be formed over the upper surface of the color filter layer 202. In another alternative, a common electrode may be formed over the upper surface of the color filter layer 202 if the LCD is vertical field actuating device, such as a TN mode. In yet another alternative, the color filter layer 202 can be omitted.

In the case that the protrusions 120 are formed corresponding to the central portions of the column spacers 210 and the compensation patterns 130 having a height lower than the height of the protrusions 120 are formed corresponding to the edges of the column spacers 210, as described above, when one of the first and second substrates 100 and 200 is shifted by touch, a contact area between the column spacer 210 and the protrusion 120 is small, and the shifted substrate 100 or 200 can easily return to its original state. Further, the column spacers 210 are compressed due to the binding of the first and second substrates 100 and 200. However, when a large external pressure is applied to further compress the column spacers 210 to more than a designated value, both the compensation patterns 130 and the protrusions 120 support the column spacers 210 such that the pressure applied to the column spacers 210 is dispersed about contact areas on the upper surfaces of the compensation patterns and the protrusions. The dispersion of the external pressure on both the compensation patterns 130 and the protrusions 120 prevents deformation of the column spacers 210.

Figure 5A:
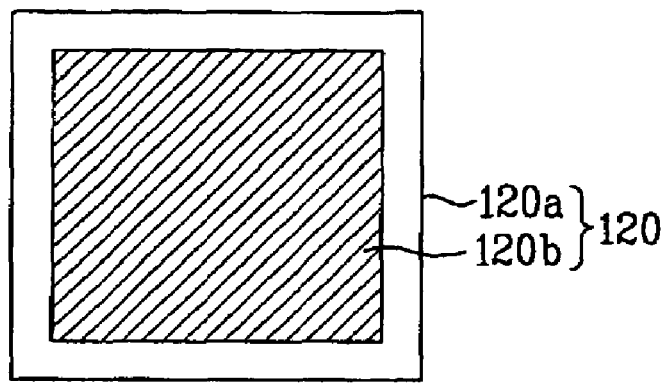
FIGS. 5A and 5B are top views of examples of a protrusion of the liquid crystal display device in accordance with an embodiment of the present invention.
Figure 5B:
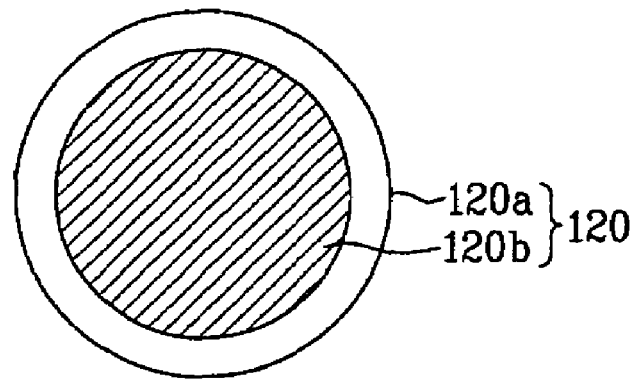

FIGS. 5A and 5B are top views of examples of a protrusion of the liquid crystal display device in accordance with an embodiment of the present invention. More specifically, FIGS. 5A and 5B are top views of examples of the protrusion 120 of the liquid crystal display device in which the protrusion 120 corresponds to the central portion of the column spacer (not shown). The protrusion 120 can have the same shape as that of the column spacer. Alternatively, the protrusion 120 may have a shape different from that of the column spacer as long as the surface of the protrusion 120 contacting the column spacer 210 has a smaller area than the surface of the column spacer 210 contacting the protrusion 120. The protrusion 120 has a double-layered structure including the lower semiconductor layer pattern 120a and the upper source/drain metal layer 120b.

Figure 6A:
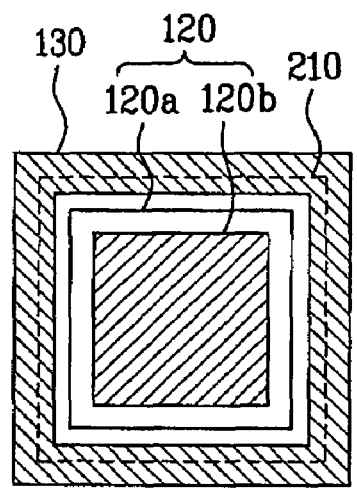
FIGS. 6A to 6D are top views of examples of the protrusion and a compensation pattern of the liquid crystal display device in accordance with an embodiment of the present invention.
Figure 6B:
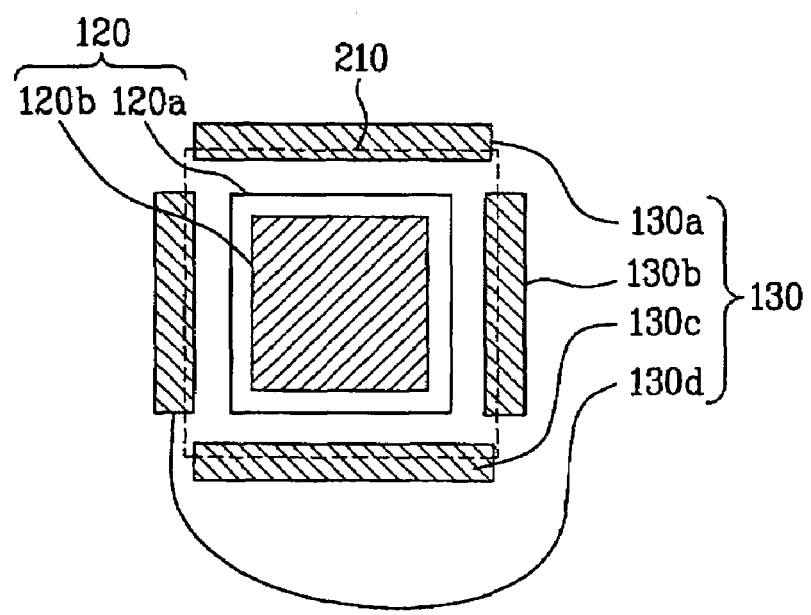
Figure 6C:
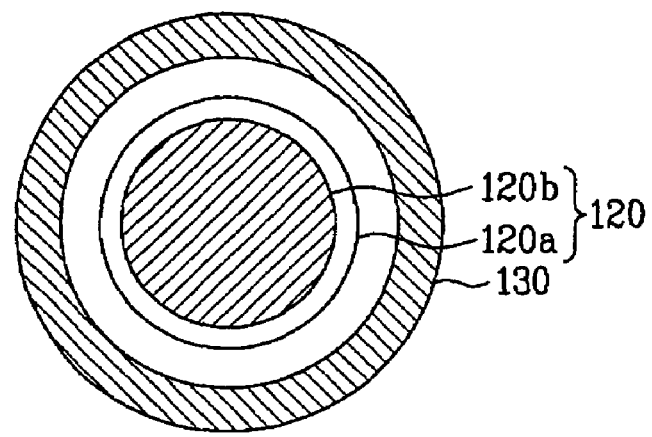
Figure 6D:
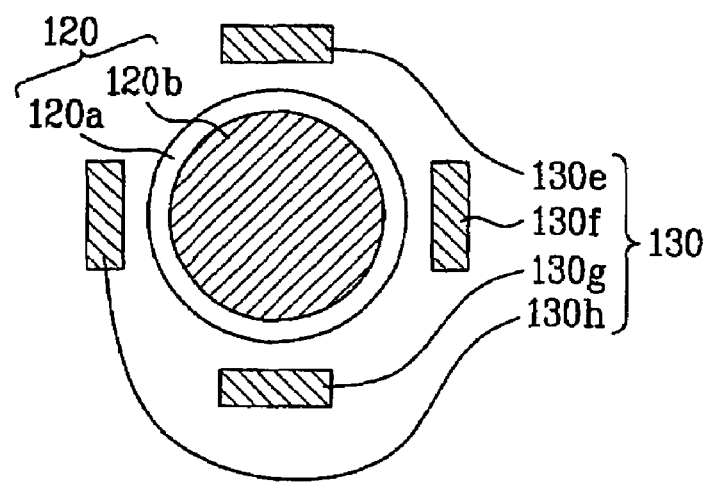

FIGS. 6A to 6D are top views of examples of the protrusion and the compensation pattern of the liquid crystal display device in accordance with an embodiment of the present invention. More specifically, FIGS. 6A to 6D illustrate the examples of the protrusion and the compensation pattern corresponding to the column spacer 210. The protrusion 120 corresponds to the central portion of the column spacer 210, and the compensation pattern 130 corresponds to the edge of the column spacer 210. The compensation pattern 130 may have a closed loop shape, as shown in FIGS. 6A and 6C, or have a plurality of patterns 130a to 130d and 130e to 130h which are disposed at regular intervals about the protrusion 120, as shown in FIGS. 6B and 6D. When a pressing pressure is more than a designated value, the compensation pattern 130 shares the support of the column spacer 210 with the protrusion 120.

The protrusion 120 may have the same shape as that of the column spacer 210, or have a shape different from that of the column spacer 210. FIGS. 6A and 6B respectively illustrate the shape of the column spacer 210 being the same as the protrusion 120. Further, FIGS. 6A and 6B show the compensation pattern 310 partially overlapping the edge of the surface of the column spacer 210.

FIG. 7 is a plan view of the liquid crystal display device in accordance with an embodiment of the present invention. As shown in FIG. 7, the liquid crystal display device of the present invention includes the first substrate 100 and the second substrate 200, which face each other, and the liquid crystal layer (not shown) filling the gap between the first and second substrates 100 and 200. The first substrate 100 includes gate lines 101 and data lines 102 crossing each other to define pixel regions, TFTs formed at the crossings of between the gate lines 101 and the data lines 102, first storage electrodes 103a electrically connected to drain electrodes 102b of the TFTs, pixel electrodes 103 branching from the first storage electrodes 103a, common electrodes 104 alternating with the pixel electrodes 103, common lines 104a connected to the gate line 101 and a pre-stage gate line (not shown) in parallel, and second storage electrodes 104b, which overlap the first storage electrodes 103a, connected to the common lines 104a and the common electrodes 104.

Each of the TFTs has a U-shaped channel region defined between a U-shaped source electrode 102a and the drain electrode 102b. Each of the TFTs includes a gate electrode 101a extending from the gate line 101, the U-shaped source electrode 102a extending from the data line 102, and a drain electrode 102b separated from the U-shaped source electrode 102a by a designated interval and protruding into the U-shaped source electrode 102a. A stacked semiconductor layer (not shown) is also formed under the data line 102, the source electrode 102a, the drain electrode 102b, and a channel region between the source electrode 102a and the drain electrode 102b. The stacked semiconductor layer is obtained by stacking an amorphous silicon layer (not shown) and an n+ layer (impurity layer; not shown), and the n+ layer (impurity layer) is removed from the channel region between the source electrode 102a and the drain electrode 102b. Except for the channel region, the stacked semiconductor layer may be selectively formed under the source and drain electrodes 102a and 102b and the channel region therebetween, or be formed under the data line 102, the source electrode 102a, and the drain electrode 102b. Although the drawings illustrate the liquid crystal display device having the U-shaped source electrodes 102a and the U-shaped channels, the source electrodes 102a of the liquid crystal display device in embodiments of the present invention may have a straight shape extending from the data lines 102 or other shapes.

The gate lines 101, the common lines 104a, and the common electrodes 104 are formed in the same layer, and are made of the same metal. A gate insulating film 105 is interposed between the gate lines 101 and the stacked semiconductor layer, and a passivation film 106 is interposed between the data lines 102 and the pixel electrodes 103. The second storage electrode 104b connected to the common line 104a passing through the pixel region, the first storage electrode 103a formed on the upper portion of the second storage electrode 104b, and the gate insulating film 105 and the passivation film 106 interposed between the second storage electrode 104b and the first storage electrode 103a form a storage capacitor. The drain electrode 102b and the first storage electrode 103a, which are formed in different layers, contact each other through a contact hole 106a formed by removing the passivation film (not shown) from the upper part of a designated portion of the drain electrode 102b.

As shown in FIG. 4, the protrusion 120 is formed at a designated portion of the gate line 101 or the common line 104a by stacking the semiconductor layer pattern 120a, which is in the same layer as the stacked semiconductor layer for the TFT, and the source/drain metal layer 120b, which is in the same layer as the source and drain electrodes 102a and 102b. Since the semiconductor layer pattern 120a has a thickness of approximately 0.2~0.3 μm and the source/drain metal layer 120b has a thickness of approximately 0.2~0.4 μm, a difference of heights between the protrusion 120 and the gate line 101 is approximately 0.4~0.7 μm. In the liquid crystal display device having the protrusions 120, when the upper and lower substrates 100 and 200 are bonded to form a cell gap, the protrusions 120 correspond to the column spacers 210. The area of the upper surface of the protrusion 120 is smaller than the area of the upper surface of the column spacer 210 (the surface of the column spacer 210 corresponding to the second substrate 200 is referred to as the lower surface), and when the protrusion 120 contacts the column spacer 210, the contact area between the protrusion 120 and the column spacer 210 is just the area of the upper surface of the protrusion 120.

The compensation pattern 130 having a height lower than that of the protrusion 120 is formed about the protrusion 120 and separated from the protrusion 120. The compensation pattern 130 may be formed in the same layer as the semiconductor layer pattern 120a or the source and drain electrodes 102a and 102b, or may be formed in the same layer as the pixel electrodes 103 and made of the same metal as the pixel electrodes 103 by another process separate from the process for forming the protrusion 120. Although the drawings illustrate the protrusion 120 and the compensation pattern 130 formed over the gate lines 101, the protrusion 120 and the compensation pattern 130 may be formed on the common lines 104a or the second storage electrodes 104b.

The second substrate 200 facing the first substrate, as shown in FIG. 4, includes the black matrix layer 201 formed on corresponding regions (gate line and data line regions) except for the pixel regions, the color filter layer 202, and the overcoat layer (not shown) formed on the black matrix layer 201 and the color filter layer 202 for planarization. When the first and second substrates 100 and 200 are bonded to each other for forming a cell gap, only a portion of the column spacer 210 corresponding to the protrusion 120 contacts the protrusion 120 and the remainder of the column spacer 210 is separated from the upper surface of the first substrate 100. When the liquid crystal display device is touched in one direction on condition that the protrusions 120 contact the column spacers 210, the first or second substrate 100 or 200 is shifted. However, since the contact area between the protrusion 120 and the column spacer 210 is small, the first or second substrate 100 or 200 is easily returned to its original state, thereby preventing non-uniformity of luminance due to touch.

During a pressing test applying at least a designated pressure, when the pressure is increased, the column spacer 210 contacting the protrusion 120 additionally contacts the compensation pattern 130, thereby increasing the contact area between the column spacer 210 and the first substrate 100 and thus dispersing the pressure. Here, a difference of heights between the compensation pattern 130 and the protrusion 120 is reduced, and the contact area between the column spacer 210 and the first substrate 100 is increased before the column spacer 210 is deformed during the pressing test. Accordingly, although the column spacer 210 is deformed by the concentration of the pressure on the column spacer 210 due to the protrusion 120 during contacting between the column spacer 210 and the protrusion 120, the edge of the column spacer 210 contacts the compensation pattern 130 before the deformation of the column spacer 210 is severe (before the column spacer 210 cannot be returned to its original state), thereby allowing the column spacer 210 to be returned to its original state after the pressing test.

The horizontal section of the column spacer 210 may have various shapes, such as a circular shape or a polygonal shape including a rectangular shape. However, the horizontal section of the column spacer 210 may have a circular shape or a regular polygonal shape in consideration of an alignment margin.

In manufacturing the liquid crystal display device of the present invention, the protrusions 120 are formed together with the formation of the TFTs, and the compensation patterns 130 are formed together with the formation of the TFTs or the formation of the pixel electrodes 103. The compensation patterns 130 are formed by different methods according to the kinds of a mask process used, i.e., a five-mask process or a four-mask process, for forming a TFT array on the first substrate 100. For example, the five-mask process requires a first mask for forming gate lines and gate electrodes, a second mask for forming a semiconductor layer, a third mask for forming data lines and source/drain electrodes, a fourth mask for forming holes of a passivation film, and a fifth mask for forming pixel electrodes. Further, the four-mask process uses a single diffraction exposure mask or a half tone mask, serving as the second and third masks of the five-mask process. In this case, diffraction exposure is performed on portions, such as channel regions, from which an upper source/drain metal layer is removed, so that only the semiconductor layer remains on the portions, and diffraction exposure is performed on the compensation patterns 130, so that only the semiconductor layer remains on corresponding portions. As is the same as the data lines 102 and the source and drain electrodes 102a and 102b, the protrusions 120 are patterned on condition that the lower semiconductor layer pattern 120a and the upper source/drain metal layer 120b are stacked.

The process for manufacturing the liquid crystal display device according to embodiments of the present invention starts with preparing a first substrate 100 and a second substrate 200. A metal layer is deposited on the first substrate 100, and is selectively removed using a first mask, thereby forming the gate lines 101, the gate electrodes 101a extending from the gate lines 101, the common lines 104a separated from the gate lines 101 by a designated interval, and the second storage electrodes 104b formed integrally with the common lines 104a. Thereafter, a gate insulating film (not shown), a semiconductor layer (not shown), and a source/drain metal layer (not shown) are deposited over the first substrate 100, including the gate lines 101.

The source/drain metal layer and the semiconductor layer are then selectively removed using a second mask, thereby forming the data lines 102 that cross the gate lines 101, the source electrodes 102a extending from the data lines 102, and the drain electrodes 102b separated from the source electrodes 102a by a designated interval, and forming the protrusions 120 being made of a semiconductor layer pattern 120a and a source/drain metal layer 120b over the gate lines 101. Here, a layer made of the same material as the semiconductor layer pattern 102a is provided in a closed loop shape about the circumferences of the protrusions 120 by a diffraction exposure to form the compensation patterns 130.

A passivation layer (not shown) is formed over the first substrate 100, including the data lines 102. Contact holes 106a for exposing designated portions of the upper parts of the drain electrodes 102b are formed by a third mask. A transparent electrode is deposited on the overall surface of the passivation film 106, including the contact holes 106a, and is selectively removed using a fourth mask, thereby forming the pixel electrodes 103 alternating with the common electrodes 104 at designated portions, and simultaneously forming the compensation patterns 130 about the protrusions 120. Thereafter, the column spacers 210, the central portions of which correspond to the protrusions 120, and the edges of which correspond to the compensation patterns 130, are formed on the second substrate 200. Liquid crystal is then dropped on one of the first and second substrates 100 and 200, and the other one of the first and second substrates 100 and 200 is reversed. Subsequently, the first and second substrates 100 and 200 are bonded to each other.

In the five-mask process, the protrusions 120 are formed by stacking the semiconductor layer pattern 120a and the source/drain metal layer 120b using second and third masks, the protrusions 120 can be made of a single layer selectively using the second or third mask. Regardless of the number of required masks in a process, the compensation patterns 130 may be formed together with the formation of the pixel electrodes by depositing the transparent electrode on the overall surface of the passivation film and selectively removing the transparent electrode.

The process for manufacturing the liquid crystal display device according to embodiments of the present invention using a four-mask process starts with preparing a first substrate 100 and a second substrate 200. A metal layer is deposited on the first substrate 100, and is selectively removed using a first mask, thereby forming the gate lines 101, the gate electrodes 101 a protruding from the gate lines 101, the common lines 104a separated from the gate lines 101 by a designated interval, and the second storage electrodes 104b formed integrally with the common lines 104a. Thereafter, a gate insulating film (not shown), a semiconductor layer (not shown), and a source/drain metal layer (not shown) are deposited over the first substrate 100, including the gate lines 101.

The source/drain metal layer and the semiconductor layer are selectively removed using a second mask, thereby forming data lines 102 crossing the gate lines 101, the source electrodes 102a protruding from the data lines 102, and the drain electrodes 102b separated from the source electrodes 102a by a designated interval, and forming the protrusions 120 including the semiconductor layer pattern 120a and the source/drain metal layer 120b on the gate lines 101.

A passivation layer (not shown) is formed over the first substrate 100, including the data lines 102. Contact holes 106a for exposing designated portions of the upper parts of the drain electrode 102b are then formed using a third mask.

Thereafter, a transparent electrode is deposited on the overall surface of the passivation film 106 including the contact holes 106a and is selectively removed using a fourth mask, thereby forming the pixel electrodes 103 alternating with the common electrodes 104 at designated portions, and simultaneously forming the compensation patterns 130 about the protrusions 120.

Column spacers 210, the centers of which correspond to the protrusions 120 and the edges of which correspond to the compensation patterns 130, are formed on the second substrate 200.

Liquid crystal is dropped on one of the first and second substrates 100 and 200, and the other one of the first and second substrates 100 and 200 is reversed. Then, the first and second substrates 100 and 200 are bonded to each other.

The above-described processes can be applied to an in-plane switching (IPS) mode liquid crystal display device. The embodiments may also be applied to a twisted nematic (TN) mode liquid crystal display device. The process for the TN mode liquid crystal display device is the same as the IPS mode liquid crystal display device except that pixel electrodes are formed as a single planar layer in the pixel regions on the first substrate and a planar common electrode is formed over the surface of a second substrate of the TN mode liquid crystal display device. Since the common lines in the TN mode liquid crystal display device are not formed in the pixel regions, column spacers and protrusions are all formed on gate lines.

As apparent from the above description, the liquid crystal display device and the method for manufacturing the same in accordance with the present invention have several effects. First, when first and second substrates are bonded to each other for forming a cell gap, only portions of column spacers contact the protrusions. Accordingly, when the liquid crystal display device is touched in one direction and one of the first or second substrate is shifted, the first or second substrate is easily returns to its original state because the contact area between the protrusions and the column spacers is small so as to prevent non-uniformity of luminance due to touch. Second, when a pressure is applied to a certain degree to one of the first and second substrates, the column spacers contacting the protrusions are additionally contacted by the compensation patterns, thereby increasing the contact area between the column spacers and the compensation patterns to disperse the pressure. Because of a difference of heights between the compensation patterns and the protrusions is reduced, the contact area between the column spacers and the compensation patterns occurs before the column spacers are deformed. Accordingly, although the column spacers are deformed by the concentration of the pressure on the column spacers due to the protrusions during contacting between the column spacers and the protrusions, the edges of the column spacers contact the compensation patterns before the deformation of the column spacers is permanent, thereby allowing the column spacers to be returned to their original state after the pressing test. Third, if the protrusion deviates off of the column spacer due to a misalignment occurrence between the first and second substrates in a bonding process, the column spacer can correspond with the compensation pattern or a predetermined portion of the compensation pattern. Accordingly, although the misalignment is happened, the column spacers can maintain cell gap stably with contacting the compensation patterns.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first substrate and a second substrate facing each other;
   column spacers at designated areas of the second substrate;
   protrusions having a first height on the first substrate corresponding to portions of the column spacers, wherein each protrusion corresponds to a center portion of each column spacer;
   compensation patterns having a second height on the first substrate corresponding to the edges of the column spacers, the second height being lower than the first height, wherein each compensation pattern corresponds to the edge of each column spacer and surrounds each protrusion, to be separate from each protrusion; and
   a liquid crystal layer filling a gap between the first and second substrates.

2. The liquid crystal display device as set forth in claim 1, further comprising gate lines and data lines crossing each other on the first substrate for defining pixel regions.

3. The liquid crystal display device as set forth in claim 2, wherein the protrusions, the column spacers, and the compensation patterns are formed over the gate lines.

4. The liquid crystal display device as set forth in claim 2, further comprising pixel electrodes in the pixel regions.

5. The liquid crystal display device as set forth in claim 4, wherein the compensation patterns are formed in a same layer as the pixel electrodes and made of the same material as that of the pixel electrode.

6. The liquid crystal display device as set forth in claim 1, wherein the protrusions are formed by sequentially stacking a semiconductor layer pattern and a source/drain metal layer.

7. The liquid crystal display device as set forth in claim 6, wherein the compensation patterns are made of the same material as that of the semiconductor layer pattern.

8. The liquid crystal display device as set forth in claim 6, wherein the compensation patterns are made of the same material as that of the source/drain metal layer.

9. The liquid crystal display device as set forth in claim 1, wherein each of the compensation patterns has a closed loop shape about each column spacer.

10. The liquid crystal display device as set forth in claim 1, wherein each of the compensation patterns has a plurality of patterns disposed at regular intervals surrounding the protrusion.

11. A liquid crystal display device comprising:
    a first substrate and a second substrate facing each other;
    gate lines and data lines crossing each other on the first substrate for defining pixel regions;
    thin film transistors at the crossing of the gate lines and the data lines;
    pixel electrodes in the pixel regions;
    protrusions having a first height over the gate lines on the first substrate;
    compensation patterns about the protrusions having a second height, the second height being lower than the first height;
    column spacers having portions corresponding to the protrusions and edges corresponding to the compensation patterns, wherein each column spacer corresponds to each protrusion at a center portion of each column spacer and corresponds to each compensation pattern at the edge of each column spacer and wherein the compensation pattern surrounds each protrusion, to be separate from the protrusion; and a liquid crystal layer filling a gap between the first and second substrates.

12. The liquid crystal display device as set forth in claim 11, wherein each of the thin film transistors includes:
a gate electrode extending from the gate line;
a semiconductor layer formed over the gate electrode; and
a source electrode extending from the data line and a drain electrode separated from the source electrode by a designated interval.

13. The liquid crystal display device as set forth in claim 12, wherein the protrusions are formed by sequentially stacking a semiconductor layer pattern formed in a same layer as the semiconductor layer and a source/drain metal layer formed in a same layer as the source and drain electrodes.

14. The liquid crystal display device as set forth in claim 12, wherein the compensation patterns are made of a semiconductor layer pattern formed in a same layer as the semiconductor layer.

15. The liquid crystal display device as set forth in claim 12, wherein the compensation patterns are made of a source/drain metal layer formed in a same layer as the source and drain electrodes.

16. The liquid crystal display device as set forth in claim 11, wherein the compensation patterns are formed in a same layer as the pixel electrodes and made of the same material as that of the pixel electrodes.

17. The liquid crystal display device as set forth in claim 11, wherein each of the compensation patterns has a closed loop shape.

18. The liquid crystal display device as set forth in claim 11, wherein each of the compensation patterns has a plurality of patterns disposed at regular intervals surrounding the protrusion.

19. A method for manufacturing a liquid crystal display device comprising:
preparing a first substrate and a second substrate facing each other;
forming column spacers at designated areas of the second substrate;
forming protrusions having a first height on the first substrate corresponding to portions of the column spacers;
forming compensation patterns having a second height on the first substrate corresponding to the edges of the column spacers, the second height being lower than the first height, wherein each protrusion corresponds to a center portion of each column spacer and wherein each compensation pattern corresponds to the edge of each column spacer and surrounds each protrusion, to be separate from the protrusion; and
forming a liquid crystal layer filling a gap between the first and second substrates.

20. The method as set forth in claim 19, further comprising forming gate lines and data lines crossing each other on the first substrate for defining pixel regions.

21. The method as set forth in claim 20, wherein the protrusions, the column spacers, and the compensation patterns are formed over the gate lines.

22. The method as set forth in claim 20, further comprising forming pixel electrodes in the pixel regions.

23. The method as set forth in claim 22, wherein the step of forming the compensation patterns includes forming a same layer as the pixel electrodes and the same material as that of the pixel electrode.

24. The method as set forth in claim 19, wherein the step of forming the protrusions includes sequentially stacking a semiconductor layer pattern and a source/drain metal layer.

25. The method as set forth in claim 24, wherein the step of forming the compensation patterns includes forming the same material as that of the semiconductor layer pattern.

26. The method as set forth in claim 24, wherein the step of forming the compensation patterns includes forming the same material as that of the source/drain metal layer.

27. The method as set forth in claim 19, wherein each of the compensation patterns has a closed loop shape about each column spacer.

28. The method as set forth in claim 19, wherein each of the compensation patterns has a plurality of patterns disposed at regular intervals surrounding the protrusion.

* * * * *